United States Patent
Permut et al.

(10) Patent No.: US 6,260,115 B1
(45) Date of Patent: Jul. 10, 2001

(54) SEQUENTIAL DETECTION AND PRESTAGING METHODS FOR A DISK STORAGE SUBSYSTEM

(75) Inventors: Alan R. Permut; John Timothy O'Brien, both of Louisville; Keith Allen Radebaugh, Denver; Hendrikus Everhardus Vandenbergh, Lafayette, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/311,216

(22) Filed: May 13, 1999

(51) Int. Cl.[7] ................................................. G06F 12/08
(52) U.S. Cl. ..................... 711/134; 711/133; 711/137; 711/136; 711/156
(58) Field of Search ................................. 711/113, 133, 711/137, 134, 136, 156

(56) References Cited

U.S. PATENT DOCUMENTS

| | | | |
|---|---|---|---|
| 5,317,718 | * 5/1994 | Jouppi | 711/137 |
| 5,761,706 | * 6/1998 | Kessler et al. | 711/118 |
| 5,761,717 | 6/1998 | Vishlitzky et al. | 711/136 |
| 5,809,529 | * 9/1998 | Mayfield | 711/137 |
| 5,954,801 | * 9/1999 | Sokolov | 710/5 |
| 5,958,040 | * 9/1999 | Jouppi | 712/207 |
| 6,092,149 | * 7/2000 | Hicken et al. | 711/113 |

FOREIGN PATENT DOCUMENTS

| | | |
|---|---|---|
| 0 509 231 | 10/1992 | (EP) . |
| 0 712 082 | 5/1996 | (EP) . |

* cited by examiner

*Primary Examiner*—Reginald G. Bragdon
*Assistant Examiner*—Christian P. Chace
(74) *Attorney, Agent, or Firm*—Brooks & Kushman P.C.

(57) ABSTRACT

A method for detecting and remembering multiple sequential access patterns made from a host to a memory system having one or more logical storage devices. Once a sequential access pattern is detected, one or more tracks are requested to be prestaged ahead of the current access request. The number of tracks requested to be prestaged ahead may be responsive to the amount of storage available in the cache memory. One list is provided for each logical storage device. Each list has multiple entries and is logically divided into two parts. A sequential part contains entries for access streams which the system has determined are sequential and for which the system may have prestaged one or more tracks into cache. A candidate part contains information about recent host accesses which have not as yet been determined to be sequential. The entries within each of the two parts of the list are logically ordered in a most-recently-used fashion. The division between the two parts of the list is allowed to change so that although the total number of entries may be held constant, the proportion of the entire list allocated to each of the two parts can be varied. Inactive entries in the list are invalidated over time.

27 Claims, 13 Drawing Sheets

SEQUENTIAL DETECTION AND PRESTAGING METHODS FOR A DISK STORAGE SUBSYSTEM

TECHNICAL FIELD

The present invention relates to the field of sequential detection and track prestaging methods in a disk storage system.

BACKGROUND ART

The pattern of access requests by a host processor to a specific logical volume of a storage device in a cached disk storage system may contain a mixture of random and sequential patterns during any given time frame. This mixture may be caused by changes in the access request patterns presented by the host applications, and by the presence of multiple data sets on a given logical volume of a storage device. Storage management software programs, such as the System Managed Storage program, can complicate the mixture even more by changing the placement of multiple data sets on any given volume over time. Disk storage locations for a mainframe host can be logically described by its logical device, cylinder, track and record address. Other systems may use Logical Block Addresses (LBA). Sequential patterns or streams occur when the host application accesses these locations in increasing address sequences such as increasing cylinder, track or record number or increasing LBA. Any reference to sequential detection using cylinder, track or record number, and references to prestaging tracks into cache can be easily extended by one skilled in the art to apply to sequential detection for LBA addressing and pre-staging appropriate LBAs into cache.

Modern storage subsystems frequently employ one or more levels of mapping of logical disk addresses as presented and referenced by the host to physical storage locations in the storage subsystem such as cache memory locations and/or physical disk locations. For example it is very common to map Count, Key and Data (CKD) addressing for a large number of logical devices from mainframe hosts to LBA addressing on a much smaller number of physical disk drives. The invention described here is largely independent of the mapping schemes employed. Unless otherwise stated, the sequential detection schemes described are in reference to the host view of data addresses. The mapping or translation of these addresses into physical addresses on the actual hard disk drives that store data, even for the purpose of prestaging the desired data into cache memory, is carried out by methods outside the scope of this invention.

Performance of cached disk storage systems is improved by prestaging tracks or logical blocks from the storage devices into cache memory when sequential access request patterns occur. Host sequential patterns are sometimes also referred to as sequential streams. Host programs which access tracks or logical blocks in sequential order may set special flags in the sequence of commands presented to the storage subsystem to provide explicit sequential access hints. The storage subsystem may also recognize particular command sequences which result from executing programs which access data in sequential order. These command sequences provide implicit hints of sequential access, referred to later as prestaging hints. Alternatively the subsystem may detect the sequential nature of a group of access requests. Sequential patterns may occur concurrently with other sequential requests or with otherwise independent or random access requests on a given logical volume. When a sequential pattern is detected, either due to hints or due to software detection of the sequential nature of access patterns, one or more tracks or LBAs are prestaged into the cache memory in anticipation of a subsequent access request. The intent is to change what would otherwise be a cache miss into a cache hit which reduces the service time as seen by the host processor. In order to increase the probability of having a track in cache by the time the host accesses that track, prestaging processes should prestage some number of tracks ahead of the current access and then maintain prestaging a sufficient number of tracks ahead of the host access to allow time for the tracks to be staged from disk. The number of tracks ahead of the current access will be referred to as the prestage factor. The prestage factor may vary for different scenarios such as different sequential hints, different command types or recent history of sequential patterns that indicate that sequential access is likely to continue. Effective prestaging methods must coordinate the use of sequential hints presented directly by the host processors, implied hints contained in the channel programs, and sequential detection methods where no hints are present. Effective prestaging methods must also record which tracks have already been prestaged to avoid requesting the prestaging of the same tracks multiple times which would waste valuable storage subsystem processing cycles and possibly even back-end bandwidth. It is desirable to only prestage those additional tracks necessary to maintain a desired prestage factor ahead of the current host access.

Simple sequential detection methods compare the address of the requested track with the just previously accessed track for a given volume or device. This approach works well for single streams of access requests, but fails to maintain sequential detection and prestaging when multiple sequential streams are executed concurrently for the same logical device, or when one or more sequential streams execute concurrently with random access requests on that logical device. Multiple concurrent streams of access frequently occur as a result of multiple applications accessing the same logical volume. One approach to solving this problem is to record information in the logical track directory entries of each logical storage device. This information would indicate which tracks are part of a sequential pattern and which tracks have been prestaged. However, in a disk storage system with a large number of possible directory entries, it is expensive to keep a directory entry for every possible track in a fast access type memory to allow the rapid checking of prior track directory entries for sequential detection, making this approach impractical.

DISCLOSURE OF INVENTION

The present invention is a method for detecting and remembering multiple sequential access patterns made from a host to a memory system having one or more logical storage devices. Once a sequential access pattern is detected, one or more tracks are requested to be prestaged ahead of the current access request. One list, having multiple entries, is provided for each logical storage device. The list is logically divided into two parts. One part, the sequential part, contains entries for access streams which the system has determined are sequential and for which the system may have prestaged one or more tracks into cache. A second part of the list, the candidate part, contains information about recent host accesses which have not as yet been determined to be sequential. These typically either have not included host sequential hints or have not been recognized as sequential patterns by meeting certain sequential pattern criteria. The entries within each of the two parts of the list are logically ordered in a Most Recently Used (MRU) fashion. The division between the two parts of the list is allowed to change so that although the total number of entries may be held constant, the proportion of the entire list allocated to each of the two parts can be varied. An insertion point in the list defines the boundary between the two parts of the list. In order to ensure the ability to detect new sequential streams in the presence of otherwise random accesses, the insertion point is maintained to always keep a minimum amount of storage available in the list for candidate entries.

MRU lists themselves are well known in the prior art. A MRU list has implied order with the most recent list entry at the logical head or top of the list, the oldest entry at the logical bottom or tail of the list and the intervening entries maintained in logical order. The order of entries can be maintained physically by rearranging the stored information in memory although this is very inefficient. The order is usually maintained logically by the use of singly or doubly linked lists, or as in the present invention by maintaining a data structure describing the order of a limited number of entries. Insertion of a new entry, as differentiated from promotion of an existing entry which only results in re-ordering the elements of the list, may cause a logically older entry or Least Recently Used (LRU) entry to logically be removed from or aged off of the list. In the remainder of this disclosure a description of moving or promoting an entry to the top or head of the MRU list, or inserting an entry into a defined part of the MRU list, it is understood to mean that the logical ordering of the list is modified by any of the well known methods for maintaining ordered lists.

Each entry in a list contains logical storage address information for a recent host access request. When a new access request is received from the host the list for the appropriate logical device is searched for entries which contain an address which precedes or very nearly precedes the current requested address, for example by having the same cylinder number but a track number one less than the current address. The preferred decision processes will be described in more detail later. If an entry meeting the criteria is found, then the current access request is considered a continuation of the candidate access stream described by the matched list entry and process decisions are made as to whether or not to prestage one or more tracks or LBAs, and whether or not the entry meets sequential detection criteria and needs to be logically moved to the sequential part of the list. The entry is always promoted to the head of the appropriate part of the MRU list, sequential or candidate, if it is not already at that logical position. The entry is also updated with the current address information.

If a host access contains sequential hints and if no existing entry is found which meets the criteria of a just preceding address, the current address information is stored in an entry at the head of the sequential part of the list as a new sequential entry, possibly pushing an older entry off of some part of the MRU list. If there is no existing entry which meets the criteria of a just preceding address, and there are no host sequential hints, the current address information is stored in an entry at the insertion point of the list as a new candidate entry, possibly resulting in an older entry being logically pushed off the bottom of the candidate portion of the MRU list. An aging method allows inactive entries which have not been updated within a defined time period to be logically removed from the sequential part of the list, freeing that position for future candidate entries by making an appropriate adjustment in the insertion point.

When deciding the number of tracks to prestage ahead of the current access, defined as the prestage factor, prestaging processes may take into account host prestaging or sequential hints, detection of very long sequential patterns or even the amount of cache memory configured in the subsystem. The information contained in the list entries may be used to demote from cache those tracks that lag a certain address range behind the current address in a sequential stream.

In order to prevent a large number of concurrent sequential host access streams from flooding cache with prestaged tracks resulting in premature demotion of tracks from cache before the host can access them, the methods of the present invention keep a global count of the number of sequential streams and compares this count to a limit which is based on the size of cache configured in the subsystem. In the event that the limit is exceeded, the subsystem will reduce the prestage factor for sequentially detected streams and sequential hinted streams until an adequate number of sequential entries age off the collection of all lists for all logical devices. In the extreme case the prestage factor may be reduced to zero such that no additional prestaging is allowed until the global count of sequential streams returns to a more acceptable level for the configured cache size.

An essential aspect of the present invention is the provision for remembering those host sequential streams which are most recent and not utilizing the memory resources to remember all past sequential streams. Likewise it is an important aspect of the present invention to be able to detect new sequential streams from among only recent host accesses. Thus candidate entries are maintained only for the most recent host access.

Accordingly, it is an object of the present invention to provide a method for detecting and remembering one or more recent sequential access patterns from a host, and for requesting prestaging of one or multiple tracks for each sequential access pattern detected. A MRU list is provided for each storage device in the storage system to record detected sequential patterns and candidates for sequential patterns. One entry is made in the list for each sequential access pattern detected and each sequential candidate.

Another object of the invention is to provide a method for creating new sequential entries in the list as new sequential access patterns are detected, or for promoting candidate entries to sequential entries. Each new or promoted sequential entry is logically ordered at the head of the sequential part of the MRU list. New candidate entries may also be created in the list for recent access requests that are not part of any sequential access pattern, but are candidates to become part of such a pattern. New candidate entries are added to the list at the head of the candidate portion of the MRU list using an insertion point which demarcates the boundary between the sequential portion and the candidate portion of the list.

Another object of the invention is to check each access request received from the host against the existing entries in the list. When the access request is a continuation of a sequential pattern recorded by a sequential entry, then that entry is promoted to the head of the sequential portion of the MRU list. When the access request is a continuation of a pattern recorded in the candidate portion of the list, but has not yet met the criteria for sequential detection, the entry is updated and promoted to the head of the candidate portion of the MRU list. When the access request and a matching candidate entry satisfy a sequential pattern criteria, then the matching candidate entry is converted to a sequential entry and promoted to the head of the sequential portion of the MRU list. Whenever new entries are created, older list entries may be logically removed from the list.

Another object is to prestage one or more tracks ahead of the access requests that are part of a sequential access pattern. The number of tracks to prestage ahead of the current access, known as the prestage factor, may be increased when the sequential access pattern persists for a defined number of sequential tracks or LBAs.

Another object is to adjust the insertion point to provide more candidate entry slots in the list when there are fewer currently active sequential streams, and to provide more sequential entry slots to keep track of sequential streams when there are multiple concurrent sequential access streams. A floor for the insertion point exists to ensure that a minimum number of candidate entry slots are available for the detection of new sequential streams.

Another object is to check the sequential entries periodically to identify inactive sequential entries for removal from the sequential part of the list, thereby making the storage for these entries available for candidate entries.

Yet another object is to limit the product of the number of sequential streams and the prestage factor for sequential streams in the subsystem as a function of the size of the configured cache in the subsystem.

These and other objects, features and advantages will be readily apparent upon consideration of the following detailed description in conjunction with the accompanying drawings.

BEST MODE FOR CARRYING OUT THE INVENTION

The present invention is applied to caching storage systems having one or more logical storage devices, preferably hard disk drives. Except where noted below, each logical device is treated independently.

Figure 1:
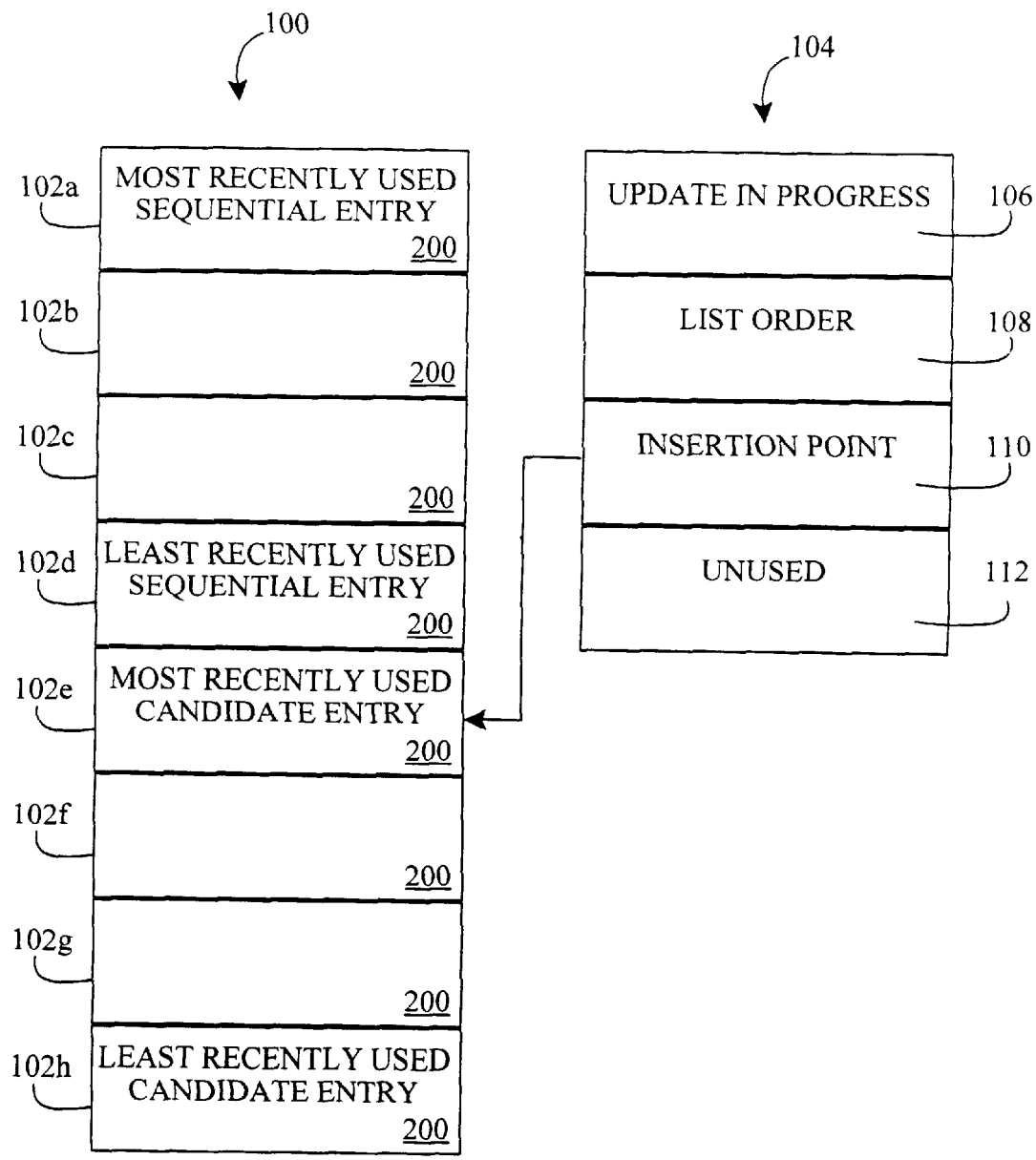
FIG. 1 is a data structure of an individual entry, a list of entries, and a control word used to implement the present invention.

FIG. 1 is a data structure that implements the present invention. The data structure consists of one list 100 for each logical storage device in the storage system. Each list 100 contains multiple slots 102 that are used to record entries 200 (described in FIG. 2) of detected sequential access patterns and sequential candidates for the respective logical storage device. List 100 may contain two or more slots 102. As the number of slots 102 increases, more entries 200 can be recorded. More slots 102, however, require memory and more processor cycles to search through the list 100. Fewer slots 102 require less memory and processor cycles, but they cannot remember as many entries 200. In the preferred embodiment, each list 100 has eight slots 102.

Figure 2:
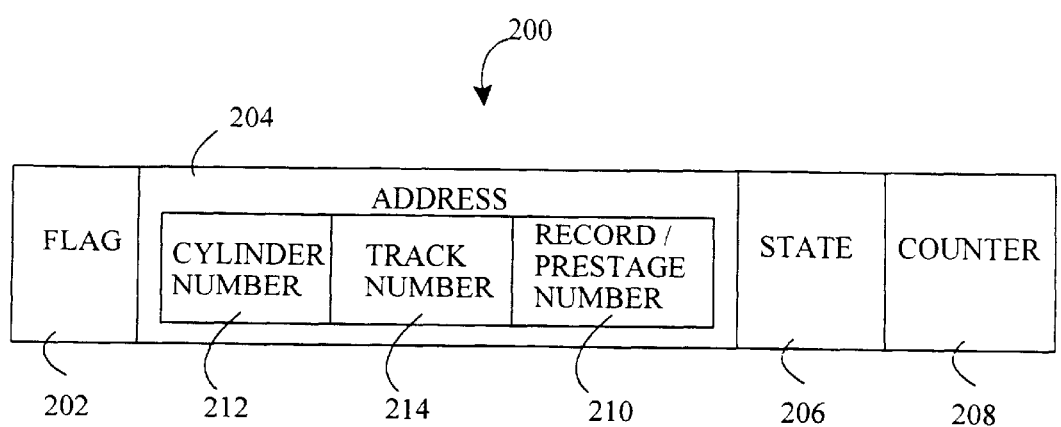
FIG. 2 illustrates the structure of each entry in the list.

Each slot 102 holds one entry 200. Each entry 200, as shown in FIG. 2, is subdivided into a flag 202, an address 204, a state 206, and a counter 208. In the preferred embodiment, each entry 200 is thirty-two bits long. One bit is used for the flag 202, twenty-five bits are used for the address 204 another two bits are used for the state 206, and the final four bits are used for the counter 208.

Flag 202 is used to determine which entries 200 are active and which have become inactive. Flag 202 is one bit and has an inactive state (represented by a logical one) and an active state (represented by a logical zero).

Address 204 is used to hold an address in the respective storage device. Address 204 is twenty-five bits long and is subdivided into a fourteen bit cylinder number 212, a four bit track (head) number 214, and the seven bit record/prestage number 210. Cylinder number 212 values ranges from zero to 16,383. Track number 214 has values ranging from zero to fourteen. Record/prestage number 210 consists of either a prestage number or a record number depending on the value of the state 206. When record/prestage number 210 is used to store a prestage number, it holds values ranging from zero to the largest number of tracks which may be prestaged ahead of the current host access which, in the preferred embodiment, is fifteen. When record/prestage number 210 is used to store a record number, it holds values ranging from zero to one hundred and twenty seven. In alternative data structures where more memory is allocated to each entry 200, the prestage number may be independent of the record number 210 in address 204. Prestage number 210 is used to record the number of tracks ahead of the current host access which have been requested for prestaging.

State 206 is used to distinguish among three different states of entries 200. State 206 is two bits long and signifies the state of candidate (represented by binary 00), the state of sequential (represented by binary 01), and the state of very sequential (represented by binary 10). In the preferred data structure, when state 206 signifies the state of candidate then the record/prestage number 210 holds the record number. When state 206 signifies the state of sequential or very sequential then the record/prestage number 210 holds the prestage number.

Counter 208 is used to count the number of sequential access requests the entry 200 has encountered in a sequential stream. Counter 208 may be used to count sequential records, sequential tracks, sequential blocks or other data address units which could be used to identify sequential patterns. Counter 208 is four bits long and ranges in value from zero to fifteen.

Referring back to FIG. 1, the data structure defines one control word 104 for each logical storage device in the system. Each control word 104 is thirty-two bits long. Control word 104 is subdivided into an update in progress 106, a list order 108, and an insertion point 110. Update in progress 106 is used in a locking process to limit changes to list 100 to one microprocessor or execution thread at a time. Update in progress 106 is one bit and has values of locked and unlocked.

List order 108 is used to maintain the logical order of the entries 200 without having to physically move entries 200 among the slots 102 and without having to manipulate pointers in a linked list. Maintaining a logical order in place of a physical order is preferred due to speed considerations. Using logical ordering, the ordering of all entries 200 can be changed by a single write of control word 104. In the preferred embodiment, list order 108 is twenty-four bits long and contains eight 3 bit octal fields. Each 3 bit octal field is an index to one of the eight slots 102 in list 100 where octal zero (binary 000) is an index to the physical slot 102a in list 100 and octal seven (binary 111) is an index to the physical slot 102h in list 100. When viewed as a row, the leftmost octal field represents the top of list 100 and the rightmost octal field represents the bottom of list 100. The eight octal fields in list order 108, in conjunction with insertion point 110, are used to maintain the MRU to LRU ordering of the sequential entries 200 and the candidate entries 200 of list 100. More recently used entries in the list order 108 are stored to the left of less recently used entries in list order 108.

Insertion point 110 defines a logical boundary in list 100 between the sequential entries 200, if any entries are marked sequential or very sequential by the value of state 206, and candidate entries 200. Insertion point 110 is an index to the octal field in list order 108 which identifies the most recently used (MRU) candidate entry 200 of list 100, where an insertion point 110 of octal 0 (binary 000) indexes to the leftmost octal field of list order 108, and insertion point 110 of octal 7 (binary 111) indexes to the rightmost octal field of list order 108. The rightmost 3 bit octal field of list order 108 is always an index to the least recently used (LRU) candidate entry of list 100. The MRU to LRU logical ordering of candidate entries is defined by starting from the octal field in list order 108 indexed by insertion point 110 and proceeding to the right in list order 108. If insertion point 110 has a value not equal to octal zero, then the leftmost octal field in list order 108 is an index to the entry 200 in list 100 which is the most recently used (MRU) sequential entry. The remaining octal fields in list order 108 proceeding from left to right, but to the left of the octal field of list order 108 indexed by insertion point 110, define the MRU to LRU logical ordering of sequential entries 200 of list 100.

Insertion of new sequential entries or candidate entries 200 in list 100 as well as promotion of an existing entry 200 to the logical MRU position in the sequential or candidate portion of list 100 is accomplished by manipulation of list order 108 and insertion point 110 as will be illustrated by examples that follow. Insertion of a new sequential entry or promotion of an existing candidate entry to the sequential part of the list normally results in an adjustment of the insertion point such as to increase the number of sequential entries and decrease the number of candidate entries in list 100. However, in order to ensure that the subsystem can utilize a minimum number of candidate entries for the detection of new sequential streams among otherwise random host accesses, the insertion point has a limit such that, in the preferred embodiment, at least two candidate entries can be inserted or updated in list 100. Thus the maximum value that insertion point 110 is allowed to attain is six in the preferred embodiment. In any of the remaining descriptions involving the insertion or promotion of entries to MRU sequential entries, if the insertion point would be increased beyond this value, instead it is not incremented. It is permissible to have all eight entries with a state 206 of sequential or very sequential, and thus are remembered as sequential streams and eligible for promotion to MRU sequential entries. But constraining the insertion point value ensures that new random access requests can be inserted in the candidate part of the list and therefore become candidates for detecting new sequential streams.

Figure 3:
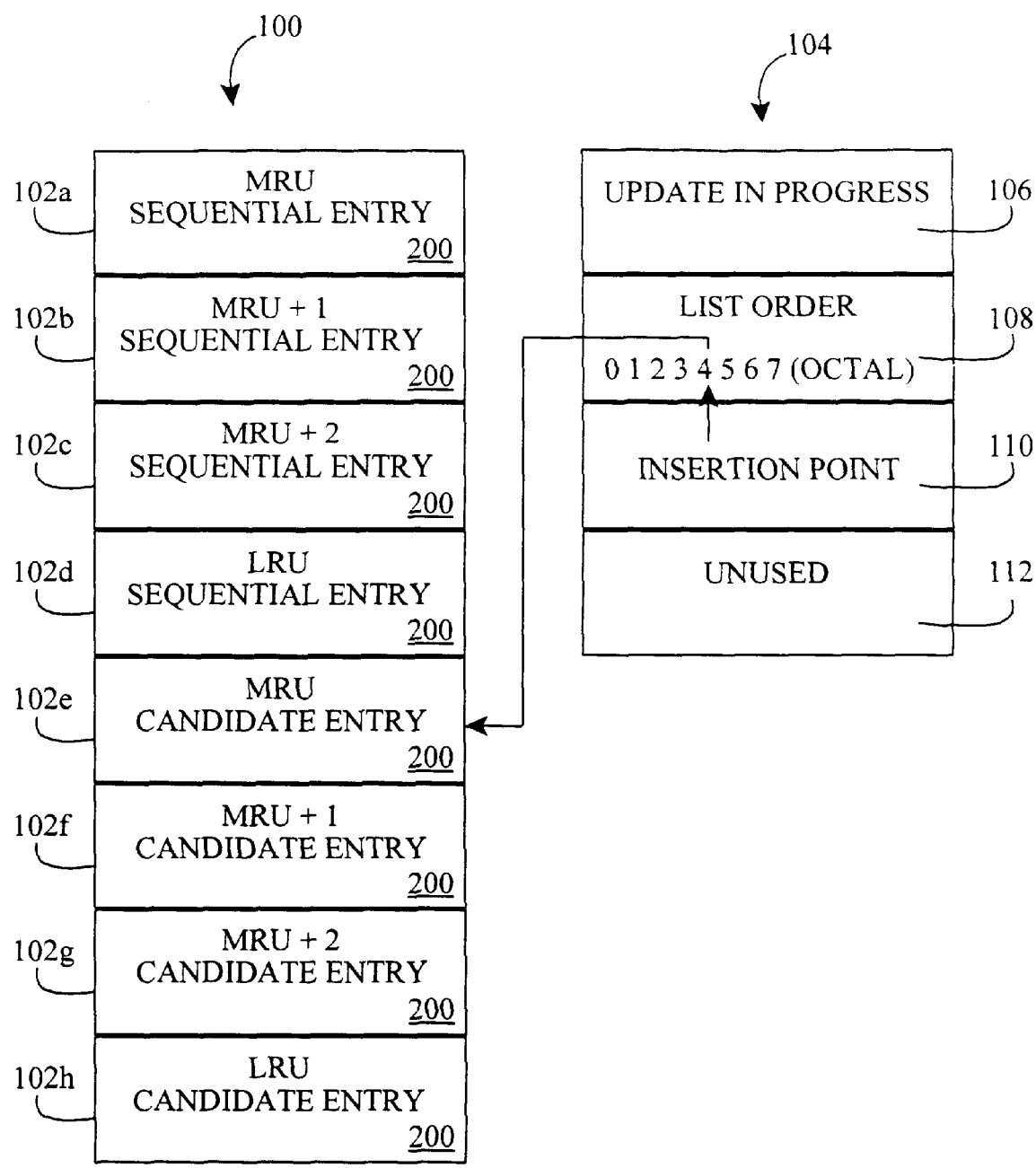
FIG. 3 illustrates a sample list where the physical order matches the logical order.

Understanding the relationship among the list entries 200 in list 100, list order 108 and insertion point 110 is aided by examination of FIG. 3, FIG. 4, FIG. 5 and FIG. 6. List 100 in FIG. 3 is shown with the physical order matching the logical order for ease of understanding. FIG. 3 shows four sequential entries and four candidate entries. Insertion point 110 has a value of four.

Figure 4:
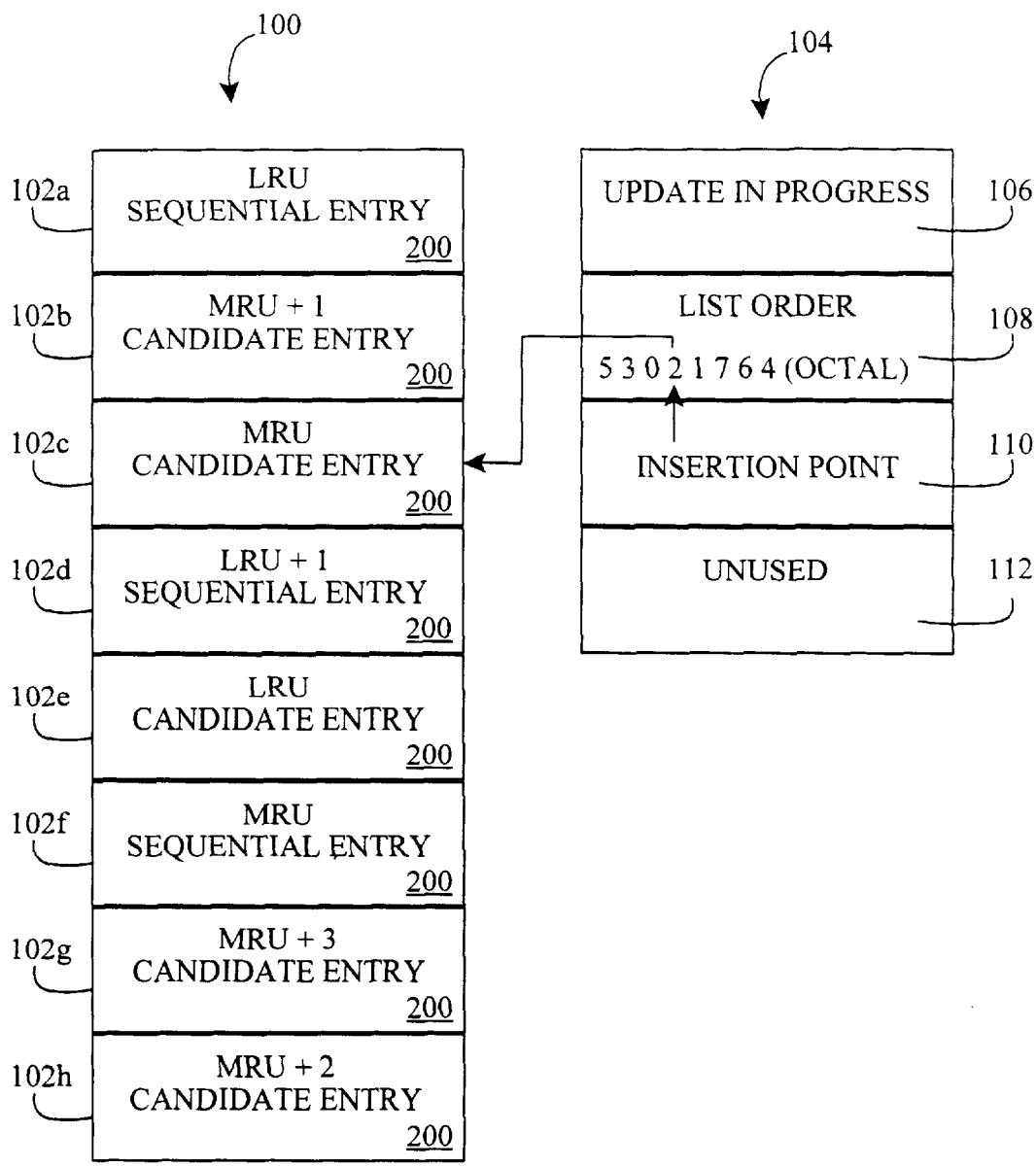
FIG. 4 illustrates another sample list where the physical order does not match the logical order.

FIG. 4 depicts a more typical scenario where the physical and logical order are different. The scenario starts with three sequential entries and five candidate entries. List order 108 has a value of 53021764 octal and insertion point 110 has a value of three. Therefore physical slots 102f, 102d and 102a respectively are the three sequential entries in MRU order while slots 102c, 102b, 102h, 102g and 102e respectively are the five candidate entries in MRU order.

Figure 5:
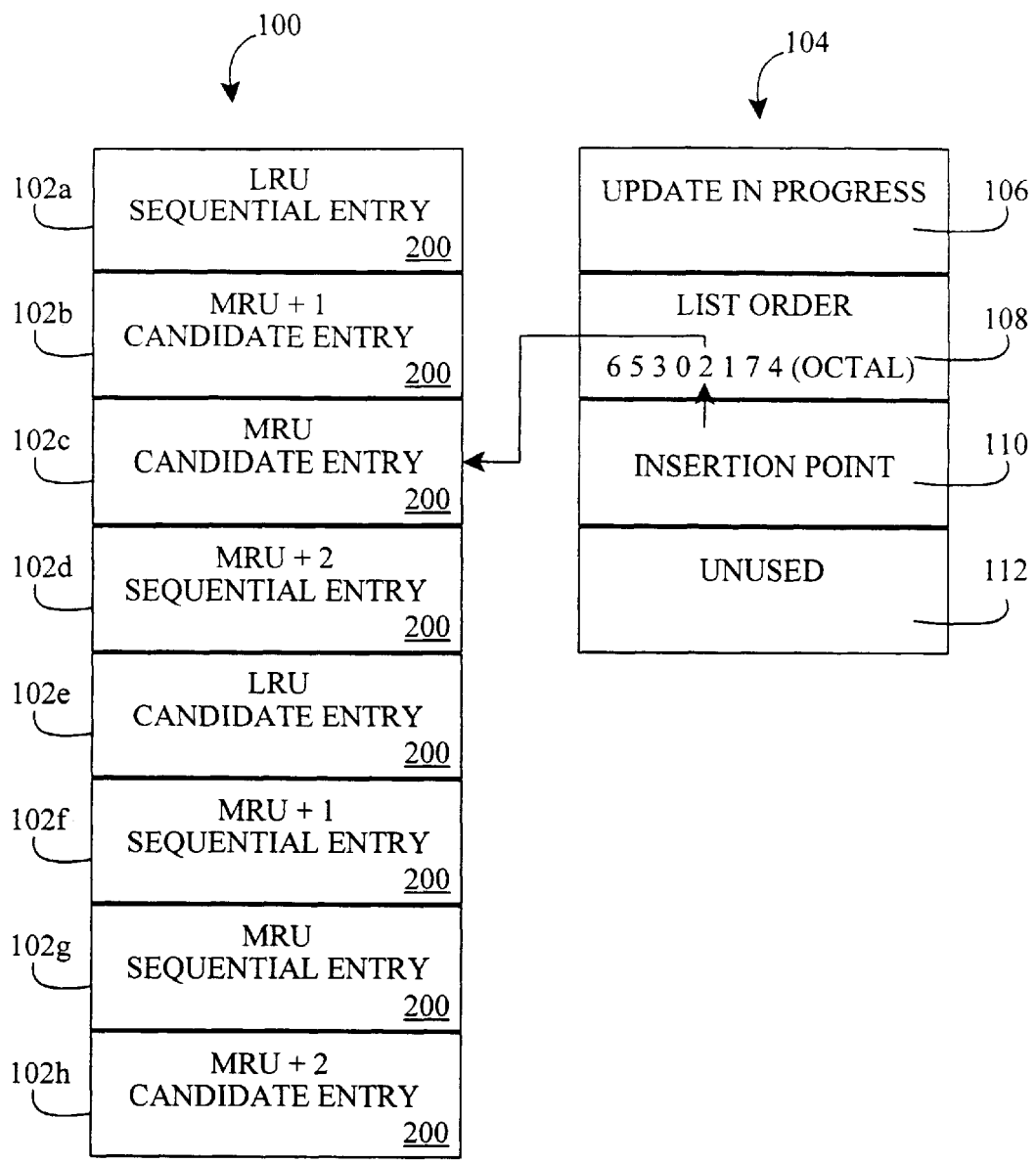
FIG. 5 is the sample list of FIG. 4 after a candidate entry has been promoted to the top of the sequential portion of the list.

FIG. 5 shows the revised logical ordering of list 100 which occurs as a result of promoting the candidate entry in slot 102g in FIG. 4 to the MRU sequential entry. Note that insertion point 110 has been incremented to four. There are now four sequential entries and four candidate entries.

Figure 6:
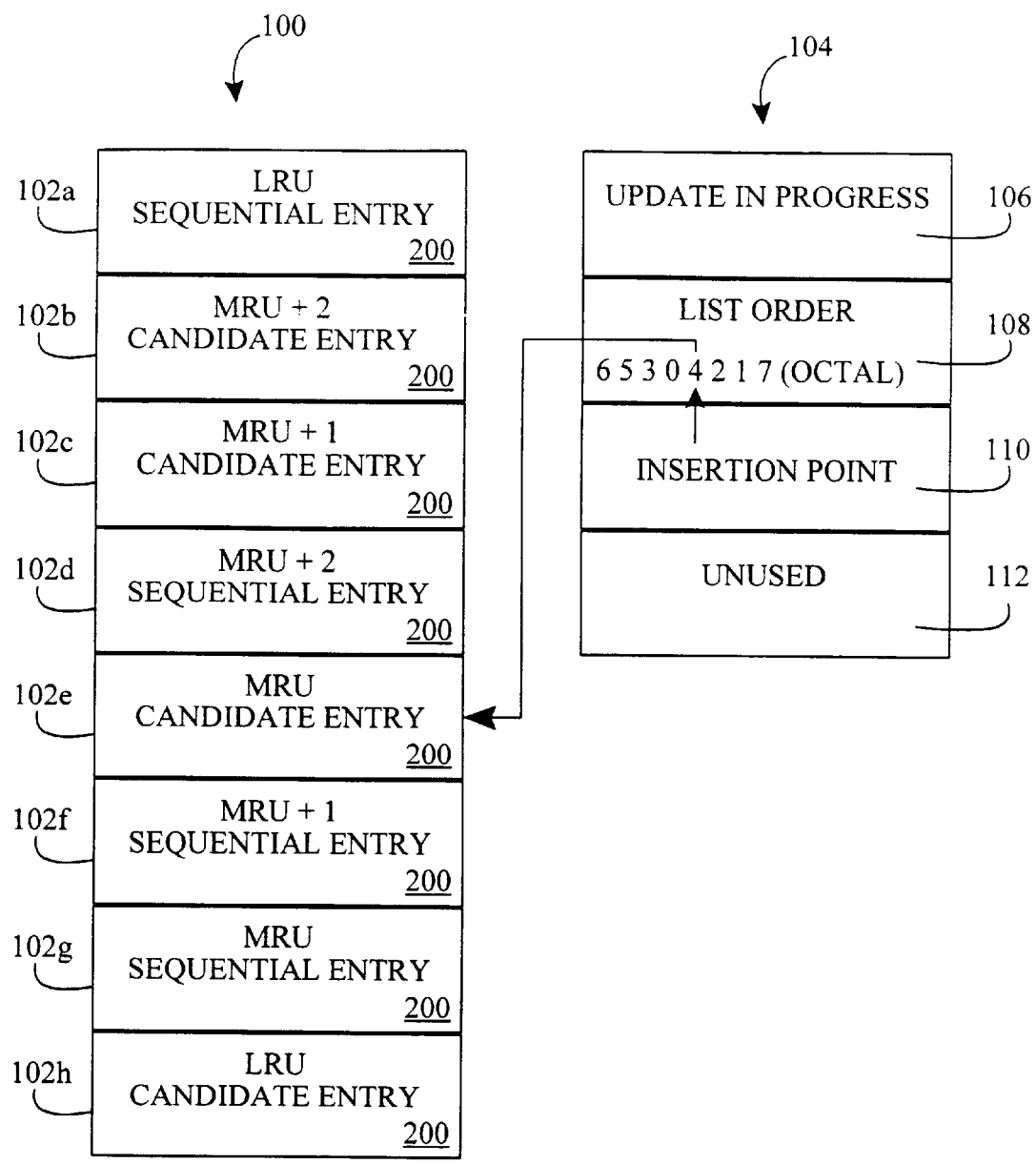
FIG. 6 is the sample list of FIG. 5 after a new candidate entry has been added to the candidate portion of the list.

FIG. 6 shows the revised logical ordering of list 100 which occurs as a result of promoting the candidate entry in slot 102e of FIG. 5 to the MRU candidate entry. As will be explained in more detail later, this would occur as the result of a host access which was a continuation of the access pattern address stored previously in slot 102e, or as the result of a new host access which was not a continuation of any pattern stored in any of the slots 102 in list 100. Note that the insertion point remains equal to four. The number of sequential entries and candidate entries has not changed. Also note that if this resulted from an access that was not a continuation of any pattern, then the candidate entry that was previously stored in slot 102e as the LRU candidate entry is overwritten with the new entry. This is the same as logically pushing the LRU entry off of the bottom of the list.

Throughout the remainder of the description of the preferred embodiment, language which indicates the insertion of a new entry, or promotion of an entry to the MRU sequential entry or promotion of an entry to the MRU candidate entry is to be understood in the context of the previous description of the manipulation of list order 108 and insertion point 110.

The remaining four bits of control word 104 are currently unused 112 and reserved for future enhancements.

FIG. 7 is a flow diagram of the pattern detection and prestage process for the preferred embodiment. For illustration purposes the process will be described for CKD addressing from a mainframe host with cylinder, track and record addressing. One skilled in the art could easily modify the approach to operate with LBA and other host addressing schemes. The process starts with the reception of an access requests from the host, as shown in block 700. At block 702 the current command is checked to determine if it is eligible for prestaging. Some commands, for example format writes, would not be reasonable commands for prestaging. If the command is not eligible, then the process is done. At block 704 a test is made for the presence of prestaging or sequential hints. A host access request may include commands or flags which provide prestaging and/or sequential hints. Host sequential hints indicate that the application is likely to access data sequentially for some number of tracks or blocks, possibly beyond the current command chain. More limited prestaging hints are provided by commands that indicate the host intends to access a group of tracks, but may not continue sequential access beyond the current command chain. One example of a prestaging hint is a Locate Record Domain which indicates the host will read a limited number of tracks, for example 1 or 2 tracks beyond the first referenced address given in the command chain. Sequential hints or flags which can be interpreted as sequential hints, often included in a host Define Extent Command, include but are not limited to sequential access, sequential prestage, extended sequential, read track set and partitioned data set search requests.

From the test at block 704, if there are no prestage or sequential hints, at block 706 the current access request address is compared to the entries 200 in list 100 to search for a continuation of an access already recorded in list 100. A pattern continuation is satisfied if the address 204 of an entry 200 is within a predefined address range behind the address of the current access request. Examples of continuation sequences are the next record on the same track, the next track on the same cylinder, the first track of the next cylinder, and for LBA addressing, the next LBA. The present invention will consider an access a continuation of a previously identified sequential stream even if a sequential stream skips some number of tracks at the end of a cylinder. This situation occurs for example when an application program uses the Virtual Sequential Access Method (VSAM). VSAM may create free space in data sets by not writing data in the latter tracks of cylinders. This allows for the addition of new data in a database by later using these free tracks. Consequently, the host will not attempt to read the free tracks as part of a normal sequential access sequence. To account for this situation, the present invention regards an access to the first track of a cylinder C to be a continuation of a sequential pattern if there is a sequential entry already in the list with an address of cylinder C-1 and a track number T within a defined range of track numbers at the end of a cylinder. For cases where a first stream of sequential access requests is operating in the last tracks of cylinder C-1, and a subsequent and independent second stream starts accessing the first track in cylinder C, the second stream will take over the sequential entry belonging to the first stream. While this is incorrect, it is not a problem since the tracks for the first stream have already been prestaged into the cache memory, and after a few additional access requests from the first stream, a new sequential entry will be created.

At block 706, if the current access is not a continuation of the access described by an entry found in list 100, at block 708 a new MRU candidate entry is inserted at insertion point 110, flag 202 is set to active, address 204 is set to the address of the current access, including the cylinder number 212, track number 214 and record number 210, state 206 is set to candidate, and counter 208 is set to zero to indicate it is the first access of a candidate pattern. A list entry 200 in list 100 which is marked as invalid (described later) or the least recently used (LRU) candidate entry 200 is used to hold the new MRU candidate entry. If the LRU candidate entry is chosen, its contents are overwritten, thereby logically pushing the entry that was previously the LRU entry off of the list.

Returning to block 706, if the current access is a continuation of the access described by an entry 200 in list 100, then at block 710 the state 206 of entry 200 is tested for a value of sequential or very sequential. If it is not, then at block 712 the counter 208 is tested for a value of one less than a sequential threshold. The sequential threshold may be set at a value which experience has determined is a reasonable indicator of the probability that a sequential pattern may continue. In the preferred embodiment the sequential threshold for determining a pattern of sequential tracks is set at three such that the third track in a sequential pattern satisfies the threshold. A sequential pattern can also be identified by sequential record accesses. An independent threshold may be used for testing this threshold. In the preferred embodiment the sequential threshold for determining a pattern of sequential records is set at five such that the fifth record in a sequential pattern satisfies the threshold.

At block 712 if counter 208 does not meet the threshold test then at block 714 the matched entry is promoted to the MRU candidate entry. Flag 202 is set to active, address 204 is set to the current address, including the cylinder number 212, track number 214 and record number 210, state 206 is set to candidate and counter 208 is incremented by one to record an additional count in a candidate access pattern. If at block 712 the counter threshold test is satisfied, then at block 716 the entry is promoted to the MRU sequential entry. Flag 202 is set to active, address 204 is set to the current address, including the cylinder number 212 and track number 214 but not the record number 210, state 206 is set to sequential and counter 208 is incremented by one to record an additional count in a sequential access pattern. Whenever state 206 is set to sequential the record number field 210 of address 204 is not updated with the record number of the current address because this field will be used instead to record the prestage number. At block 718 track prestage requests are made to other software subsystems in the control unit to prestage the desired tracks into cache. The number of tracks requested for prestage is determined by the desired prestage factor for this case which in the preferred embodiment is six for state 206 being sequential. Prestage number 210 is set to record the number of tracks ahead of the current access that were requested for prestage.

Returning to decision block 704, if the host access contains prestaging or sequential hints, the process continues at block 720 (FIG. 7B) to determine the number of tracks desirable to prestage ahead of the current access request based only on the host provided hint. The host might provide a prestaging hint, using for example a Locate Record Domain hint, which specifies how many tracks will be accessed with the current command chain. The additional tracks beyond the current access request should be prestaged if they have not already been prestaged. Similarly, a host sequential hint which indicates the likelihood of continuing sequential processing beyond the current access request and even beyond the current command chain may warrant prestaging some defined number of tracks, the prestage factor, ahead of the current access, if such tracks have not already been requested for prestaging. In the present invention, the desired number of tracks to prestage ahead is remembered in a temporary storage location. This value is typically the greater number of the additional tracks indicated with a domain prestaging hint, or a fixed distance to prestage ahead for other types of sequential hints. In the preferred embodiment, a host sequential hint would ordinarily result in staying 6 tracks ahead of the current access, unless the hint is for a special case such as but not limited to a partitioned data set search assist command sequence or for a special high speed data mover command chain, in which cases the control unit would prestage 15 tracks ahead of the current access.

At decision block 722, if the current access is not a continuation of an entry 200 in list 100, then at decision block 724 the host provided hint is tested for the presence of a sequential hint. If the hint is a prestaging hint, but not a sequential hint, then processing continues at block 726 with the insertion of a new MRU candidate entry 200 in list 100 at the insertion point 110. Flag 202 is set to active, address 204 is set to the current address, including the cylinder number 212, track number 214 and record number 210, state 206 is set to candidate and counter 208 is set to zero. At block 728 the number of tracks to prestage which was determined at block 720 is used to make prestage requests to other software subsystems to prestage the desired number of tracks ahead of the current host access as indicated by the prestaging hint. Under some circumstances, requests for prestaging tracks which have previously been requested may occur. This is an example where utilizing additional memory for storing the record number and prestage number in separate storage locations instead of a combined use in 210 of entry 200 would result in more optimal operation. In the preferred embodiment the tradeoff was made to combine the uses of this field in entry 200 to conserve memory requirements. By maintaining field 210 of entry 200 for the record value of address 204, sequential detection based on sequential record number is possible. At decision block 729, if state 206 is not sequential the process is done.

At decision block 724, if the hint is a sequential hint, then at block 730 a new MRU sequential entry 200 is inserted at the logical head of the sequential MRU part of list 100. Flag 202 is set to active, address 204 is set to the current access address, including the cylinder number 212, track number 214 but not record number 210, state 206 is set to sequential, counter 208 is set to zero. At block 728 the number of tracks to prestage determined at block 720 is used to make prestage requests to other software subsystems to prestage the desired number of tracks ahead of the current host access based on the sequential hint. Then at decision block 729, a state 206 of sequential results in execution of block 731 where the prestage number is set to indicate the number of tracks prestaged ahead of the current address 204. The value of prestage number 210 allows the process to later avoid repeat prestage requests for tracks which have already been prestaged when a host access is found to be a continuation of the access described by an entry 200 at decision blocks 706 or 722.

At decision block 722 if the current access is a continuation of the access described by a list entry 200 in list 100 then at decision block 732 state 206 of the identified entry 200 is tested. If state 206 is sequential or very sequential, processing will continue at block 750 described later. If state 206 is not sequential or very sequential then at decision block 734 counter 208 is compared to the pre-established threshold for detected sequential access patterns. If at block 734 the sequential threshold is not met, then at decision block 746 a check is made for the presence of a sequential hint. If there was no sequential hint, the identified entry 200 is promoted to the MRU candidate entry at block 736, flag 202 is set to active, address 204 is set to the current access address, including the cylinder number 212, track number 214 and record number 210, and counter 208 is incremented by one. Processing continues at block 728. If at block 746 there was a sequential hint, at block 748 the entry 200 is promoted to the MRU sequential entry, flag 202 is set to active, address 204 is set to the current access address, including the cylinder number 212, track number 214, but not the record number 210, state 206 is set to sequential, and counter 208 is incremented by one. Processing continues at block 728. If at block 734 counter 208 is one less than the sequential threshold, meaning the current access will satisfy the sequential threshold, then processing will continue at block 740. As was previously described for decision block 712 this threshold test may be made for sequential tracks or records. At block 740 the identified entry 200 is promoted to the MRU sequential entry, flag 202 is set to active, address 204 is set to the current access address, including the cylinder number 212, track number 214 but not record number 210, and the counter 208 is incremented by one. At block 742 the desired prestage factor is determined as the maximum of the tracks to prestage for the prestage or sequential hints or of the tracks to prestage for the state 206 of sequential. In the preferred embodiment the number of tracks to prestage ahead of the current access for a state 206 of sequential is six. At block 744 prestage requests are made for the determined number of tracks to prestage ahead of the current access by calls to other software subsystems in the control unit. Prestage number 210 is set to record the number of tracks prestaged ahead of the current access.

If at block 732 state 206 was determined to already be set to sequential or very sequential, then at block 750 (FIG. 7D) entry 200 is promoted to the MRU sequential entry, flag 202 is set to active, address 204 is set to the current access address, including the cylinder number 212, track number 214 but not record number 210. At decision block 752 if state 206 is very sequential, processing continues at block 758. The prestage factor is determined as the maximum of the tracks to prestage for the prestage or sequential hints or of the tracks to prestage for the state 206 of very sequential. In the preferred embodiment of the present invention, a state 206 of very sequential will result in a prestage factor of fifteen tracks ahead of the current host access request. At block 760 counter 208 is updated by incrementing by one unless incrementing by one would result in overflow of the counter. Therefore counter 208 has a maximum value in the preferred embodiment of 15 decimal based on the use of a four bit field. Most importantly in block 760 the number of additional tracks to prestage to satisfy or maintain the desired prestage factor is determined and the additional prestage requests are made to other software subsystems in the control unit. This is done by comparing the prestage number 210 to the desired prestage factor. Only those additional tracks to achieve the prestage factor are requested for prestage. For example if prestage number 210 is currently six and the desired prestage factor is fifteen, then nine additional tracks are requested for prestaging. Then prestage number 210 is updated to indicate the number of tracks ahead of the current access address that have been requested for prestage.

If at decision block 752 state 206 is not very sequential, then at block 754 counter 208 is tested for a value one less than the threshold for a state of very sequential. In the preferred embodiment the threshold for very sequential is set at eight. If this test is satisfied then state 206 is set to very sequential at block 756 and processing continues at block 758. Otherwise at block 762 the prestage factor is determined as the maximum of the tracks to prestage for the prestage or sequential hints or of the tracks to prestage for the state 206 of sequential. Processing then continues at block 760.

Figure 7A:
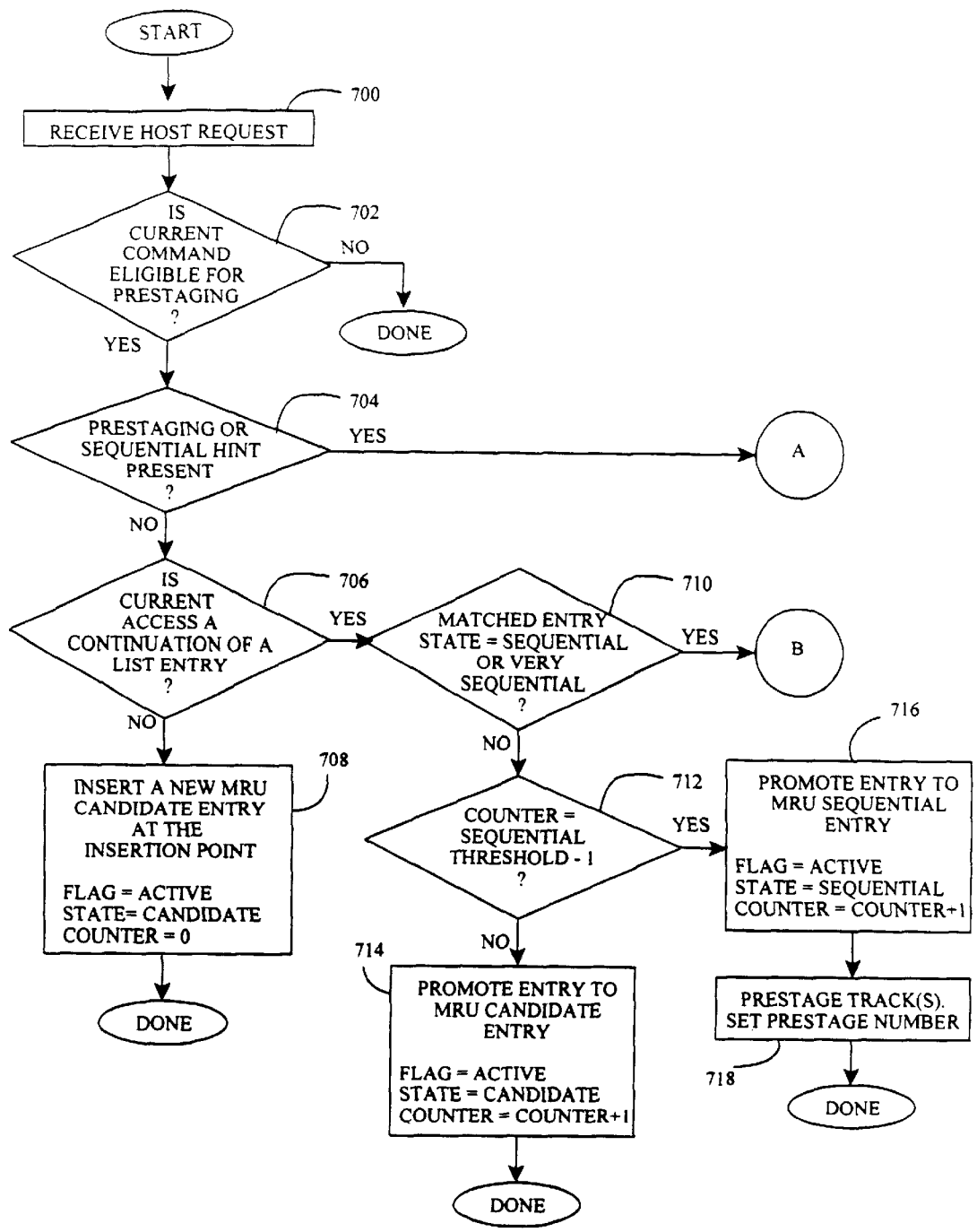
FIGS. 7A–7D is a flow diagram of a pattern detection and prestage request process.
Figure 7B:
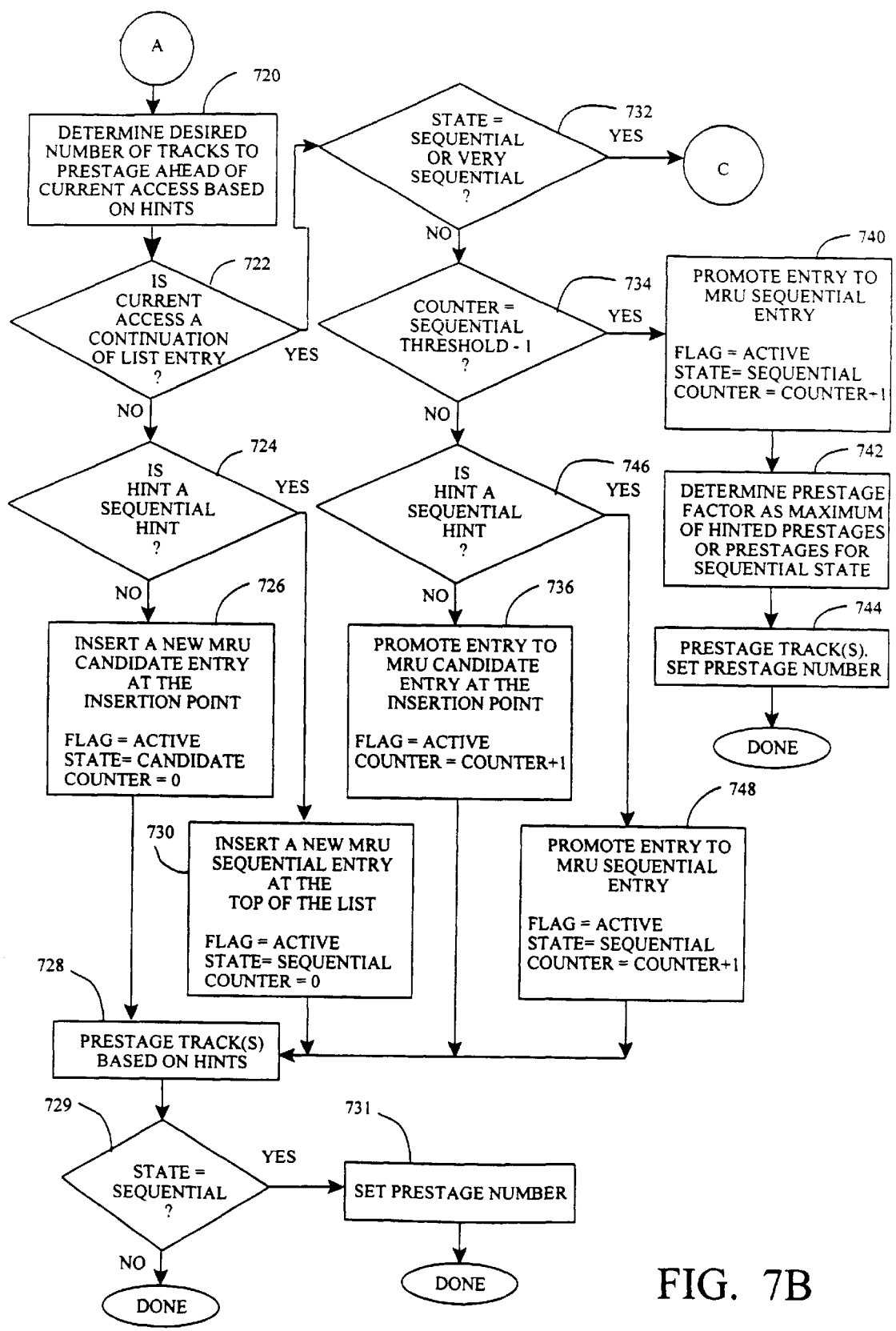
Figure 7C:
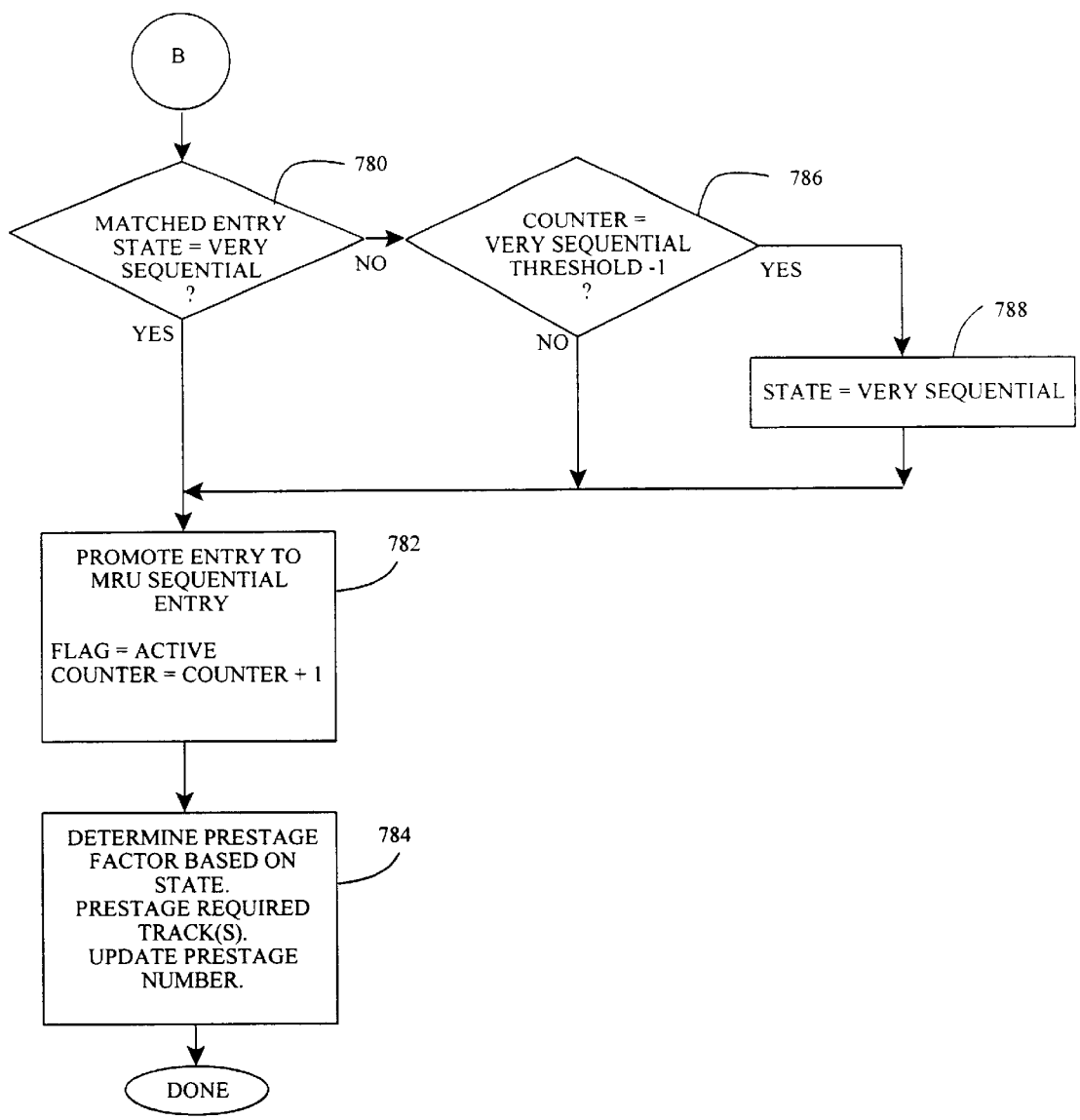
Figure 7D:
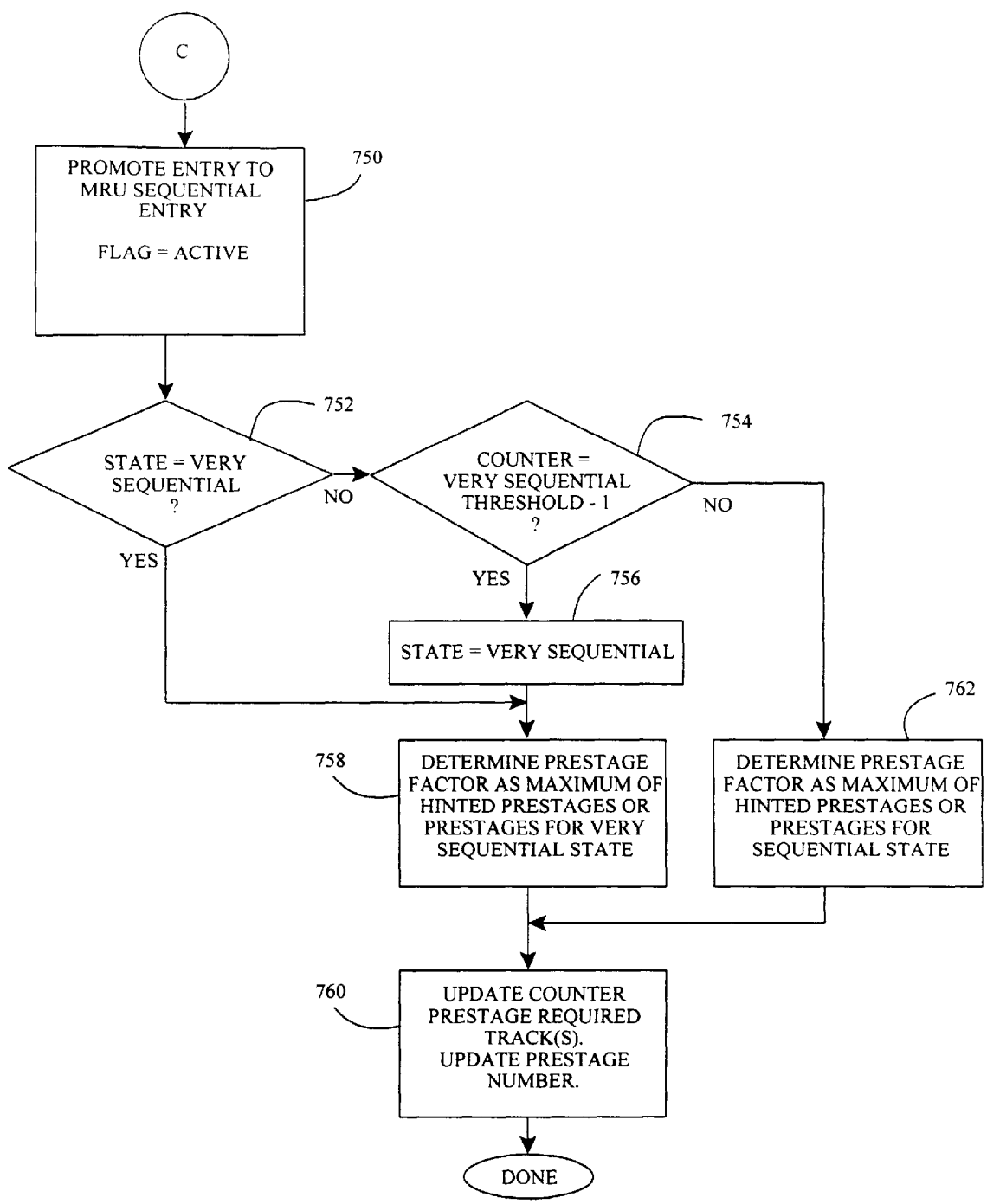

Returning to decision block 710 in FIG. 7A, if the matched entry 200 has a state 206 of sequential or very sequential, then at block 780 (FIG. 7C) if state 206 is not already set to very sequential then at block 786 counter 208 is tested for a value one less than the threshold for very sequential in block 786. If it is, then at block 788 state 206 is set to very sequential and processing continues at block 782. Otherwise processing will bypass block 788 and continue at block 782. Likewise if at block 780 state 206 is already very sequential processing continues at block 782. At block 782 entry 200 is promoted to the MRU sequential entry, flag 202 is set to active, address 204 is set to the current access address, including the cylinder number 212, track number 214 but not record number 210. Counter 208 is updated by incrementing by one, unless incrementing by one would result in overflow of the counter. At block 784 the desired prestage factor is determined based on state 206. The number of additional tracks to prestage to satisfy or maintain the desired prestage factor is determined and the additional prestage requests are made to other software subsystems in the control unit. In many cases only one additional track is prestaged to maintain the desired prestage factor. Then prestage number 210 is updated to indicate the number of tracks ahead of the current access address that have been requested for prestage.

In order to prevent a large number of concurrent sequential host access streams from flooding cache with prestaged tracks, resulting in premature demotion of tracks from cache before the host can access them, the methods of the present invention keep a global count of the number of sequential streams and compares this count to a limit which is based on the size of cache configured in the subsystem. In the event that the limit is exceeded, the subsystem will reduce the prestage factor for sequentially detected streams and sequential hinted streams until an adequate number of sequential entries age off the collection of all lists 100 for all logical devices. In the extreme case, the prestage factor may be reduced to zero such that no additional prestaging is allowed until the global count of sequential streams returns to a more acceptable level for the configured cache size. Therefore at each of the blocks 718, 728, 744, 784 and 760 the total number of sequential entries 200 from all lists 100 for all logical devices is compared to a threshold which is proportional to the size of cache configured for the subsystem. If the global number of sequential entries 200 is greater than the currently established threshold, then the subsystem will reduce the prestage factor, possibly to zero. All of the other list manipulations are carried out as described previously thus maintaining the lists according to most recently used access patterns. If at such time as some number of sequential entries become invalid (described below) resulting in the global number of sequential entries 200 falling below the threshold for the configured cache, then at blocks 718, 728, 744, 784 and 760 the prestage factor will be increased.

Figure 8:
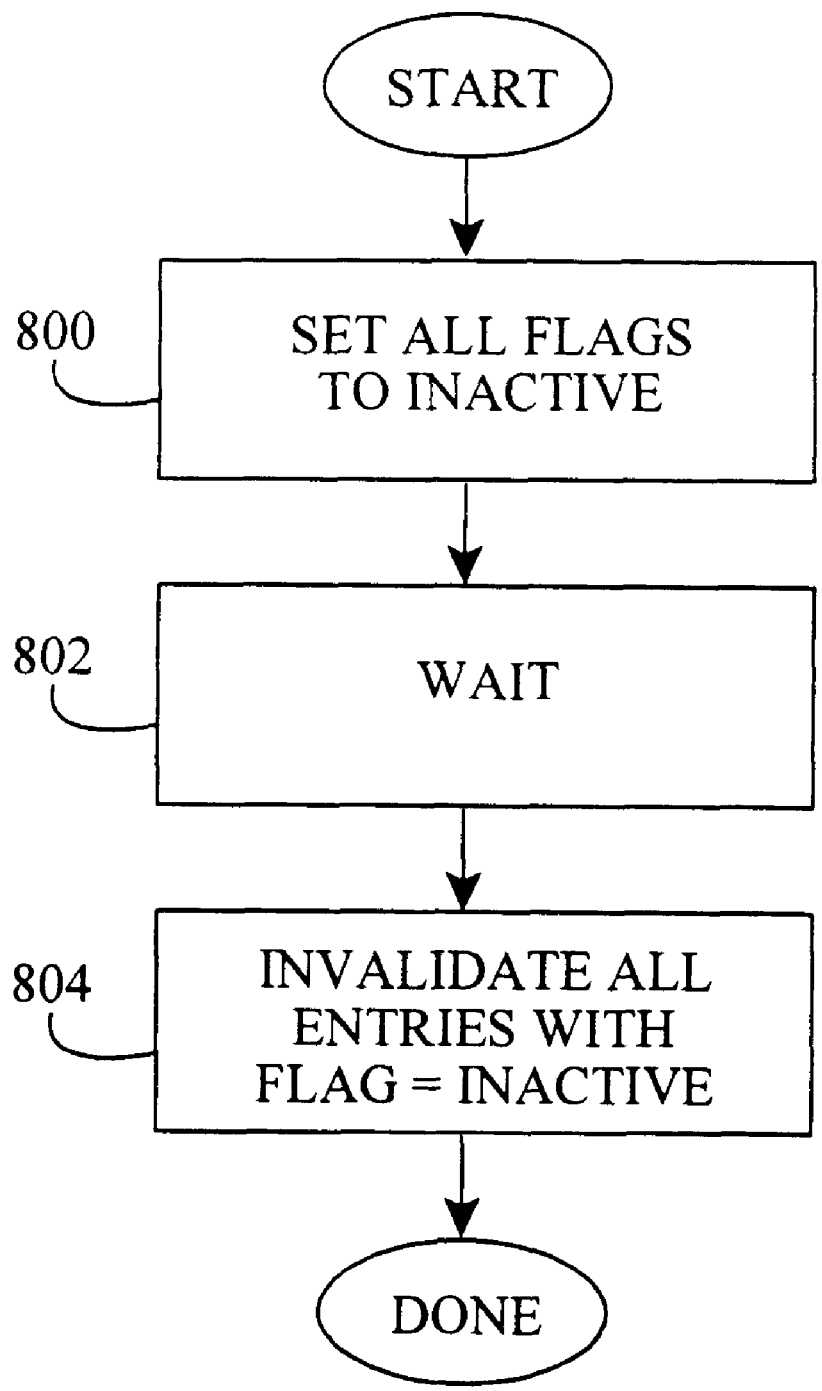
FIG. 8 is a flow diagram of a process that invalidates inactive entries in the list.

FIG. 8 is a flow diagram of a process that invalidates inactive entries 200 from list 100. Periodically, all of the flags 202 in all of the entries 200 are set to inactive, as shown in block 800. The process then waits a predetermined amount of time, as shown in block 802, to allow subsequent access requests to cause flags 202 to be changed back to active. After waiting the predetermined amount of time, each entry 200 that still has its flag 202 set to inactive is invalidated, shown in block 804. Invalidation of one or more entries is accomplished by modification of list order 108 and insertion point 110 in control word 104 to show a new logical ordering of list 100. This results in logically adjusting the insertion point 110 to create additional candidate entry slots. An invalidated entry 200 may be indicated in list 100 in one or more of several ways, for example by using out of range values in the fields of an entry 200. In an alternative implementation, only those entries 200 that have state 206 equal to sequential or very sequential are invalidated at block 804.

Figure 9:
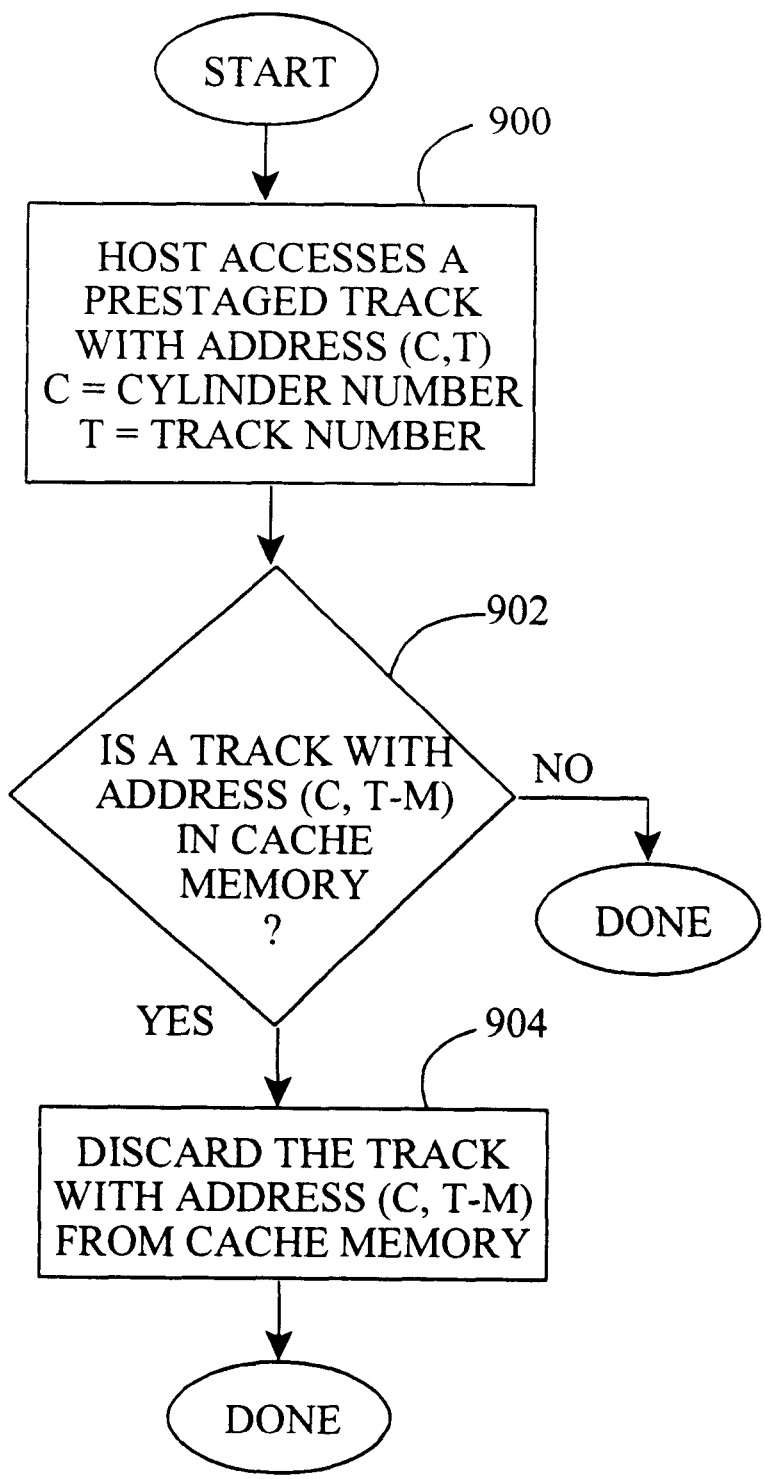
FIG. 9 is a flow diagram of a process for discarding old prestaged tracks from cache memory.

FIG. 9 is a flow diagram for a process that discards prestaged tracks from cache memory. As sequential access patterns progress, older prestaged tracks may be removed from the cache memory to make room for prestaging other tracks. This discarding process starts when the host accesses a prestaged track having an address of (C,T), where C=the cylinder number and T=the track number, as shown in block 900. Cache memory is then searched, as shown by decision block 902, for a prestaged track having an address of (C, T−M), where M is a positive integer. If such a prestaged track exists then it is removed from the cache memory, as shown by block 904, otherwise no further action is taken. If T is less than M, then the subsystem will discard the appropriate track in the previous cylinder M tracks behind the current access, if such a prestaged track is in cache. The value of M is chosen based upon the probable distance a stream of access requests may reach behind its present position, and the amount of cache memory allocated to prestaging tracks. Larger values of M allow for older prestaged tracks but consume more cache memory. Typical values for M range from one to three with three being the preferred value.

Figure 10:
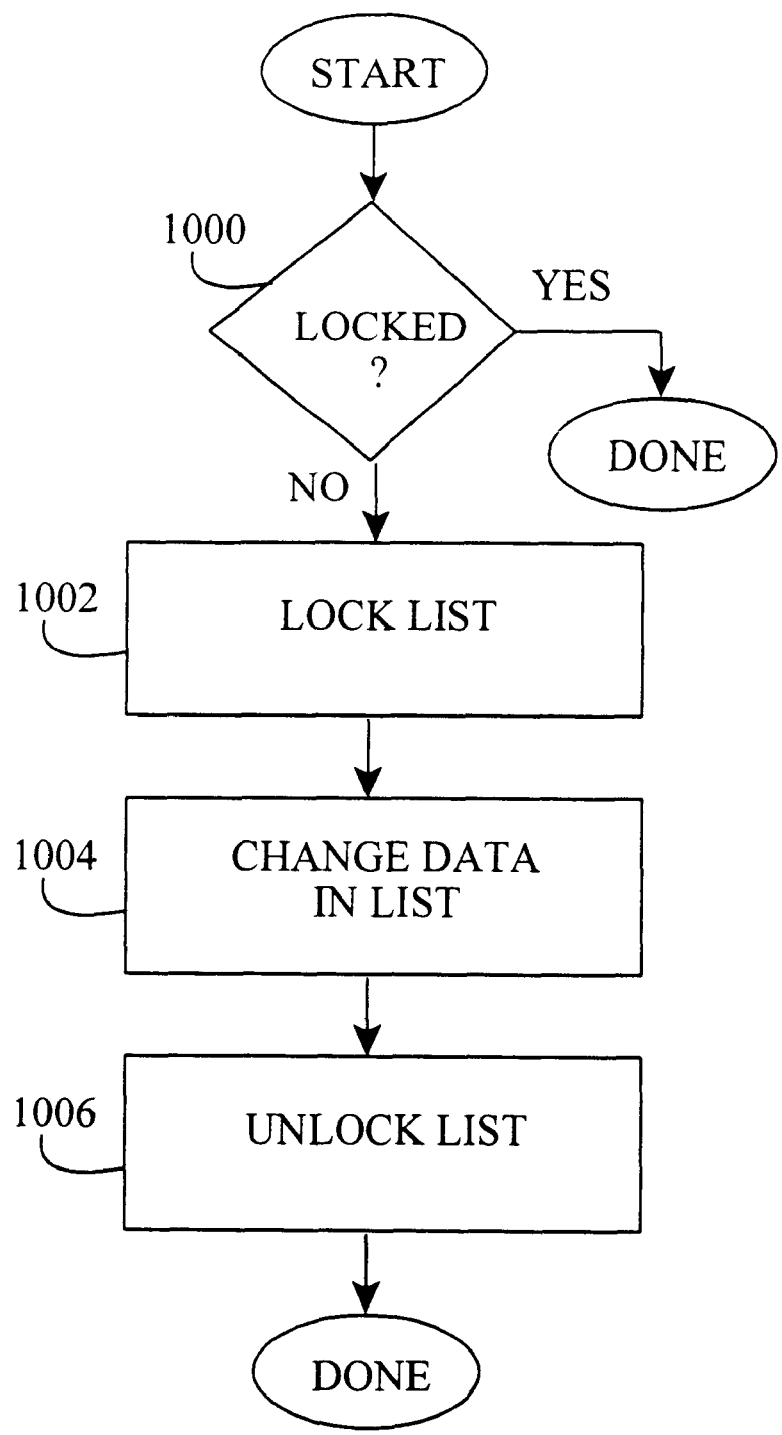
FIG. 10 is a flow diagram of a locking process for the list.

FIG. 10 is a flow diagram of a locking process applied to each list 100. This process prevents conflicts between two or more threads of execution, for example in a multiprocessing environment, attempting to access the same logical storage device data structure simultaneously. Before making any changes to the list 100 for a given logical storage device, the control unit program must check the status of the lock, as shown by decision block 1000. If the list 100 is locked then the control unit software program must either wait for the list 100 to become unlocked, or abandon the attempt to change the list. When the control unit software program finds the list 100 unlocked, it locks the list 100, as shown in block 1002, to prevent interference from another thread of execution of the control unit software program. Next, the locking execution thread may change data within the list 100, as shown in block 1004. When all of the changes are finished, the list 100 is unlocked, as shown in block 1006, so that another thread of execution in the control unit software program can update the list 100.

A variety of locking methods may be used to implement the locking process. For example, a spin-lock word (not shown) could be defined in the control word 104 for each list 100. The spin-lock word allows only one competing thread of execution to access to the list 100, and it prevents that thread of execution from keeping list 100 locked for an indefinite time. Alternatively, a range lock (not shown) may be created to lock and unlock a range of memory addresses. The preferred approach is to use the update in progress bit 106 in the control word 104 to indicate whether the list 100 is currently locked, as shown in FIG. 1. The update in progress bit 106 approach is simple, requires few processor cycles to lock and unlock, and consumes minimal memory.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for detecting sequences in a plurality of access requests from a host and requesting prestaging to a cache memory in response to receiving the plurality of access requests, wherein each access request of the plurality of access requests has an address that identifies at least one track of a plurality of tracks stored in a plurality of storage devices, each access request may provide a prestage hint, and each access request may provide a sequential hint, the method comprising:

providing a list for each storage device of the plurality of storage devices, each list having a plurality of entries, the plurality of entries being arranged in an order from a top of the list to a bottom of the list, each entry of the plurality of entries having an address; and for each access request of the plurality of access requests received the method further comprises:

inserting a first entry into the plurality of entries at the top of the list in response to receiving the access request where the access request provides the sequential hint and the address of the access request does not satisfy a continuation sequence with respect to any address of the plurality of entries, wherein the address of the first new entry is set to the address of the access request;

promoting a second entry of the plurality of entries to the top of the list in response to receiving the access request where the address of the access request satisfies the continuation sequence with respect to the address of the second entry of the plurality of entries; and requesting prestaging to the cache memory of up to a determined number of tracks of the plurality of tracks ahead of the address of the access request in response to placing the entry of the plurality of entries at the top of the list, wherein placing includes inserting and promoting.

2. The method of claim 1 wherein each entry of the plurality of entries further includes a state having values of sequential and candidate, the method further comprising:

providing an insertion point in the list;

inserting a third entry into the plurality of entries at the insertion point in the list in response to receiving the access request where the access request does not provide the sequential hint, and the address of the access request does not satisfy the continuation sequence with respect to any address of the plurality of entries, wherein the address of the third entry is set to the address of the access request and the state of the third entry is set to candidate;

promoting a fourth entry of the plurality of entries to the insertion point in the list in response to receiving the access request where the access request does not provide the sequential hint, the address of the access request satisfies the continuation sequence with respect to the address of the fourth entry, and the state of the fourth entry is equal to candidate; and requesting prestaging to the cache memory of up to the determined number of tracks of the plurality of tracks ahead of the address of the access request in response to the access request providing the prestage hint and placing the entry of the plurality of entries at the insertion point in the list, wherein placing includes inserting and promoting, wherein the state of the first entry of the plurality of entries is set to sequential, and wherein the second entry of the plurality of entries is promoted to the top of the list if the state of the second entry is not equal to candidate.

3. The method of claim 2 wherein each entry of the plurality of entries further includes a counter initialized to zero, the method further comprising:

incrementing the counter in the second entry and the fourth entry of the plurality of entries in response to receiving the access request where the address of the access request matches the continuation sequence with respect to the address of the second entry and the fourth entry of the plurality of entries respectively, wherein the fourth entry of the plurality of entries is promoted to the insertion point in the list if the counter of the fourth entry does not meet a sequential threshold; and promoting a fifth entry of the plurality of entries to the top of the list, setting the state of the fifth entry to sequential, and incrementing the counter of the fifth entry in response to receiving the access request where the address of the access request satisfies the continuation sequence with respect to the address of the fifth entry, the state of the fifth entry is equal to candidate, and the counter of the fifth entry meets the sequential threshold; and promoting a sixth entry of the plurality of entries to the top of the list, setting the state of the sixth entry to sequential, and incrementing the counter of the sixth entry in response to receiving the access request where the access request provides the sequential hint, the address of the access request satisfies the continuation sequence with respect to the address of the sixth entry, the state of the sixth entry is equal to candidate, and the counter does not meet the sequential threshold.

4. The method of claim 3 wherein the state includes the value of very sequential, the method further comprising setting the state of a seventh entry of the plurality of entries to very sequential in response to the counter of the seventh entry reaching a very sequential threshold, and wherein the determined number of tracks of the plurality of tracks requested to be prestaged is greater when the state of the respective entry is equal to very sequential than when the state of the respective entry is equal to sequential.

5. The method of claim 4 wherein the determined number is at least six when the state is equal to sequential and at least fifteen when the state is equal to very sequential.

6. The method of claim 4 wherein the very sequential threshold is approximately eight.

7. The method of claim 3 wherein each address includes a track number and the sequential threshold is approximately three consecutive track numbers.

8. The method of claim 3 wherein each address includes a record number and the sequential threshold is approximately five consecutive record numbers.

9. The method of claim 2 further comprising adjusting the insertion point in the list to account for the plurality of entries having the state not equal to candidate.

10. The method of claim 9 further comprising constraining the insertion point to no lower than a predetermined number of entries of the plurality of entries above the bottom of the list.

11. The method of claim 10 wherein the predetermined number is approximately one.

12. The method of claim 2 wherein each entry of the plurality of entries further includes a flag having values of active and inactive, the method further comprising:

setting the flag of each entry of the plurality of entries to inactive periodically; and invalidating all entries of the plurality of entries having the state not equal to candidate and the flag remaining at inactive a predetermined time after setting each flag of the plurality of entries to inactive, wherein inserting a new entry into the plurality of entries and promoting an existing entry of the plurality of entries includes setting the flag of the respective entry of the plurality of entries to active.

13. The method of claim 2 further comprising:

maintaining a count of the plurality of entries having the state not equal to candidate;

reducing the determined number of tracks in response to the count exceeding a predetermined value; and restoring the determined number of tracks in response to the count returning below the predetermined value.

14. The method of claim 2 further comprising setting the address of a respective entry of the plurality of entries to the address of the access request in response to promoting the respective address.

15. The method of claim 2 wherein each entry of the plurality of entries further includes a flag having values of active and inactive, the method further comprising:
   setting the flag of each entry of the plurality of entries to inactive periodically; and
   invalidating all entries of the plurality of entries having the state equal to candidate and the flag remaining at inactive a predetermined time after setting each flag of the plurality of entries to inactive,
   wherein inserting a new entry into the plurality of entries and promoting an existing entry of the plurality of entries includes setting the flag of the respective entry of the plurality of entries to active.

16. The method of claim 1 wherein each entry of the plurality of entries further includes a flag having values of active and inactive, the method further comprising:
   setting the flag of each entry of the plurality of entries to inactive periodically; and
   invalidating all entries of the plurality of entries having the flag remaining at inactive a predetermined time after setting each flag of the plurality of entries to inactive,
   wherein inserting a new entry into the plurality of entries and promoting an existing entry of the plurality of entries includes setting the flag of the respective entry of the plurality of entries to active.

17. The method of claim 1 wherein the plurality of entries are approximately eight entries.

18. The method of claim 1 wherein each entry of the plurality of entries includes a prestage number, the method further comprising storing the determined number in the prestage number of the respective entry of the plurality of entries in response to requesting prestaging to the cache memory of up to the determined number of tracks of the plurality of tracks.

19. The method of claim 18 further comprising calculating the determined number of tracks based upon the prestage number of the entry of the plurality of entries before requesting prestaging to the cache memory of up to the determined number of tracks of the plurality of tracks.

20. The method of claim 1 wherein the plurality of access requests providing the sequential hint includes at least sequential access, sequential prestage, extended sequential, read trackset, and partition data set search types of access requests.

21. The method of claim 1 wherein each address includes a cylinder number and a track number, and the continuation sequence includes a next track number on a given cylinder number and an initial track on a next cylinder.

22. The method of claim 1 wherein each address includes a track number and a record number, and the continuation sequence includes a next record number in a given track number.

23. The method of claim 1 further comprising discarding a first prestaged track of the plurality of tracks in the cache memory in response to the host accessing a second prestaged track of the plurality of tracks in the cache memory where the track number of the first prestaged track is a predetermined number of tracks behind the track number of the second prestaged track.

24. The method of claim 23 wherein the predetermined number of prestaged tracks is approximately three prestaged tracks.

25. The method of claim 1 further comprising:
   activating a lock on the plurality of entries for a select storage device of the plurality of storage devices prior to changing any entry of the plurality of entries; and
   deactivating the lock on the plurality of entries for the select storage device in response to completing the changes in the plurality of entries for the select storage device.

26. The method of claim 1 further comprising setting the address of a respective entry of the plurality of entries to the address of the access request in response to promoting the respective address.

27. A method for detecting sequences in a plurality of access requests from a host and requesting prestaging to a cache memory in response to receiving the plurality of access requests, wherein each access request of the plurality of access requests has an address that identifies at least one track of a plurality of tracks stored in a plurality of storage devices, the method comprising:
   providing a list for each storage device of the plurality of storage devices, each list having a plurality of entries, the plurality of entries being arranged in an order from a top of the list to a bottom of the list, each entry of the plurality of entries having an address, a counter initialized to zero, and a state having values of sequential and candidate;
   providing an insertion point in the list; and for each access request of the plurality of access requests received the method further comprises:
     inserting a first entry into the plurality of entries at the insertion point in the list in response to receiving the access request where the access request does not satisfy a continuation sequence with respect to any address of the plurality of entries, wherein the address of the first new entry is set to the address of the access request and the state of the first new entry is set to candidate;
     promoting a second entry of the plurality of entries to the insertion point in the list and incrementing the counter of the second entry in response to receiving the access request where the address of the access request satisfies the continuation sequence with respect to the address of the second entry of the plurality of entries, the counter of the second entry does not meet a sequential threshold, and the state of the second entry is equal to candidate;
     promoting a third entry of the plurality of entries to the top of the list, setting the state of the third entry to sequential, and incrementing the counter of the third entry in response to receiving the access request where the address of the access request satisfies the continuation sequence with respect to the address of the third entry, the counter of the third entry meets the sequential threshold and the state of the third entry is candidate;
     promoting a fourth entry of the plurality of entries to the top of the list and incrementing the counter of the fourth entry in response to receiving the access request where the address of the access request satisfies the continuation sequence with respect to the address of the fourth entry, and the state of the fourth entry is sequential; and
     requesting prestaging to the cache memory of up to a determined number of tracks of the plurality of tracks ahead of the address of the access request in response to placing the entry of the plurality of entries at the top of the list, wherein placing includes inserting and promoting.

* * * * *